STATION-KEEPING RADAR SYSTEM

Filed Sept. 26, 1960 5 Sheets-Sheet 1

INVENTORS
HAROLD K. FLETCHER
JOHN P. CHISHOLM

BY Brandler & Dowell
ATTORNEYS

Oct. 13, 1964 H. K. FLETCHER ETAL 3,153,232

STATION-KEEPING RADAR SYSTEM

Filed Sept. 26, 1960 5 Sheets-Sheet 2

INVENTORS
HAROLD K. FLETCHER
JOHN P. CHISHOLM

BY Alexander & Dowell

ATTORNEYS

Oct. 13, 1964 H. K. FLETCHER ETAL 3,153,232

STATION-KEEPING RADAR SYSTEM

Filed Sept. 26, 1960 5 Sheets-Sheet 3

INVENTORS
HAROLD K. FLETCHER
JOHN P. CHISHOLM

BY Alexander F. Dowell

ATTORNEYS

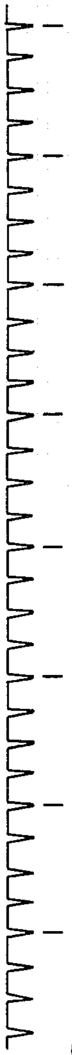

| COUNT 4000 PULSES | | FF#1 | FF#2 | FF#3 | FF#4 | FF#5 | TIME | LOGIC |
|---|---|---|---|---|---|---|---|---|
| | RESET / START | 0 | 0 | 0 | 0 | 0 | 0 | $\bar{A}_1\ \bar{A}_2\ \bar{A}_3\ \bar{A}_4\ \bar{A}_5$ |
| 1 | | 1 | 0 | 0 | 0 | 0 | 250 | $A_1\ \bar{A}_2\ \bar{A}_3\ \bar{A}_4\ \bar{A}_5$ |
| 2 | | 0 | 1 | 0 | 0 | 0 | 500 | $\bar{A}_1\ A_2\ \bar{A}_3\ \bar{A}_4\ \bar{A}_5$ |
| 3 | | 1 | 1 | 0 | 0 | 0 | 750 | $A_1\ A_2\ \bar{A}_3\ \bar{A}_4\ \bar{A}_5$ |
| 4 | | 0 | 0 | 1 | 0 | 0 | 1000 | $\bar{A}_1\ \bar{A}_2\ A_3\ \bar{A}_4\ \bar{A}_5$ |
| 5 | | 1 | 0 | 1 | 0 | 0 | 1250 | $A_1\ \bar{A}_2\ A_3\ \bar{A}_4\ \bar{A}_5$ |
| 6 | | 0 | 1 | 1 | 0 | 0 | 1500 | $\bar{A}_1\ A_2\ A_3\ \bar{A}_4\ \bar{A}_5$ |
| 7 | | 1 | 1 | 1 | 0 | 0 | 1750 | $A_1\ A_2\ A_3\ \bar{A}_4\ \bar{A}_5$ |
| 8 | | 0 | 0 | 0 | 1 | 0 | 2000 | $\bar{A}_1\ \bar{A}_2\ \bar{A}_3\ A_4\ \bar{A}_5$ |
| 9 | | 1 | 0 | 0 | 1 | 0 | 2250 | $A_1\ \bar{A}_2\ \bar{A}_3\ A_4\ \bar{A}_5$ |
| 10 | | 0 | 1 | 0 | 1 | 0 | 2500 | $\bar{A}_1\ A_2\ \bar{A}_3\ A_4\ \bar{A}_5$ |
| 11 | | 1 | 1 | 0 | 1 | 0 | 2750 | $A_1\ A_2\ \bar{A}_3\ A_4\ \bar{A}_5$ |
| 12 | | 0 | 0 | 1 | 1 | 0 | 3000 | $\bar{A}_1\ \bar{A}_2\ A_3\ A_4\ \bar{A}_5$ |
| 13 | | 1 | 0 | 1 | 1 | 0 | 3250 | $A_1\ \bar{A}_2\ A_3\ A_4\ \bar{A}_5$ |
| 14 | | 0 | 1 | 1 | 1 | 0 | 3500 | $\bar{A}_1\ A_2\ A_3\ A_4\ \bar{A}_5$ |
| 15 | | 1 | 1 | 1 | 1 | 0 | 3750 | $A_1\ A_2\ A_3\ A_4\ \bar{A}_5$ |
| 16 | | 0 | 0 | 0 | 0 | 1 | 4000 | $\bar{A}_1\ \bar{A}_2\ \bar{A}_3\ \bar{A}_4\ A_5$ |
| 17 | | 1 | 0 | 0 | 0 | 1 | 4250 | $A_1\ \bar{A}_2\ \bar{A}_3\ \bar{A}_4\ A_5$ |
| 18 | | 0 | 1 | 0 | 0 | 1 | 4500 | $\bar{A}_1\ A_2\ \bar{A}_3\ \bar{A}_4\ A_5$ |
| 19 | | 1 | 1 | 0 | 0 | 1 | 4750 | $A_1\ A_2\ \bar{A}_3\ \bar{A}_4\ A_5$ |
| 20 | | 0 | 0 | 1 | 0 | 1 | 5000 | $\bar{A}_1\ \bar{A}_2\ A_3\ \bar{A}_4\ A_5$ |
| 21 | | 1 | 0 | 1 | 0 | 1 | 5250 | $A_1\ \bar{A}_2\ A_3\ \bar{A}_4\ A_5$ |
| 22 | | 0 | 1 | 1 | 0 | 1 | 5500 | $\bar{A}_1\ A_2\ A_3\ \bar{A}_4\ A_5$ |
| 23 | | 1 | 1 | 1 | 0 | 1 | 5750 | $A_1\ A_2\ A_3\ \bar{A}_4\ A_5$ |
| 24 | | 0 | 0 | 0 | 1 | 1 | 6000 | $\bar{A}_1\ \bar{A}_2\ \bar{A}_3\ A_4\ A_5$ |
| 25 | | 1 | 0 | 0 | 1 | 1 | 6250 | $A_1\ \bar{A}_2\ \bar{A}_3\ A_4\ A_5$ |
| 26 | | 0 | 1 | 0 | 1 | 1 | 6500 | $\bar{A}_1\ A_2\ \bar{A}_3\ A_4\ A_5$ |
| 27 | | 1 | 1 | 0 | 1 | 1 | 6750 | $A_1\ A_2\ \bar{A}_3\ A_4\ A_5$ |
| 28 | | 0 | 0 | 1 | 1 | 1 | 7000 | $\bar{A}_1\ \bar{A}_2\ A_3\ A_4\ A_5$ |
| 29 | | 1 | 0 | 1 | 1 | 1 | 7250 | $A_1\ \bar{A}_2\ A_3\ A_4\ A_5$ |
| 30 | | 0 | 1 | 1 | 1 | 1 | 7500 | $\bar{A}_1\ A_2\ A_3\ A_4\ A_5$ |
| 31 | | 1 | 1 | 1 | 1 | 1 | 7750 | $A_1\ A_2\ A_3\ A_4\ A_5$ |
| 32 | RESET / START | 0 | 0 | 0 | 0 | 0 | 8000 | SAME AS ZERO |

LOGIC CHART OF TIME

Fig. 6

INVENTORS
HAROLD K. FLETCHER
JOHN P. CHISHOLM
BY Alexander & Dowell
ATTORNEYS

STATION-KEEPING RADAR SYSTEM

Filed Sept. 26, 1960 5 Sheets-Sheet 5

INVENTORS
HAROLD K. FLETCHER
JOHN P. CHISHOLM
BY Alexander & Dowell
ATTORNEYS

United States Patent Office 3,153,232
Patented Oct. 13, 1964

3,153,232
STATION-KEEPING RADAR SYSTEM

Harold K. Fletcher, Williamsville, and John P. Chisholm, Buffalo, N.Y., assignors to Sierra Research Corporation, Buffalo, N.Y., a corporation of New York Filed Sept. 26, 1960, Ser. No. 58,568
25 Claims. (Cl. 343—6)

The present invention relates to time-division multiplex radar systems, and more particularly relates to a novel system including a plurality of separate radar units operating sequentially on a shared-time base, and all on the same frequency, with novel means for preventing spurious indications resulting in confusion among the various radar units.

It is a principal object of this invention to provide a system including a plurality of synchronized radar units each located in a different aircraft and each of the radars providing in its own aircraft accurate and non-ambiguous information as to the relative location of each of the other aircraft forming a part of the system, and at the same time providing radar presentations representing the locations of other targets within the range of the radar but not participating as part of the system.

The present system is particularly useful as a station-keeping radar, for instance, serving to help maintain formations of aircraft, or serving to apprise each aircraft in a group engaged in carrying out a cooperative maneuver of the positions of the other aircraft in that group. Although this disclosure is presented in terms of aircraft stationkeeping, particularly helicopters, it is to be clearly understood that the system is generally applicable to other vehicles or ships. The present system thus provides collision avoidance, mutual information improving the efficiency of the maneuver, and radar search information.

It is another principal object of this invention to provide a time-sharing system in which the radar in any one of the aircraft is capable of initiating synchronizing signals so as to function as the master radar to which the other aircraft are synchronized as slave units, the synchronizing signals being coded for easy identification in the presence of other signals and noise, and each coded group of synchronizing signals resetting the shared-time base to begin running again. Between synchronizing pulses, the time base is accurately clocked by accurately controlled clock pulses generated locally in each aircraft, said clock pulses dividing the time base into discrete time slots uniquely assigned to the respective aircraft. The radar in each aircraft performs a pure radar function once during the running of each time base and within the particular time slot assigned to that aircraft.

Still a further principal object of the invention is to provide a time-sharing system in which each aircraft performs an interrogation function in the direction of the main lobe of the beam of its directional antenna during its uniquely assigned time slot, and in which any other of the aircraft in the system which is illuminated by the main lobe replies by means of a transponder function initiated by its own radar transmitter so that the indication of the replying aircraft on the indicator screen of the interrogating aircraft is particularly strong and well-defined. In the present system, every aircraft unit functions as a radar in its own time slot but as a transponder beacon in the other time slots when interrogated during one or more slots, all transmissions from and receptions at the various units of the system being on a single common frequency.

It is another important object of this invention to provide display of both radar target information and beacon information on a common presentation, with display blanking during the operation of each local unit in the beacon mode so that each unit displays only that information which was obtained during its own radar time slot.

Still another important object of the invention is to provide millimicrosecond switching of the receiving means at each unit from an omnidirectional antenna to a directional antenna and back so that the omnidirectional antenna is operative during the beacon-transponder mode of operation of the unit and the directional antenna is operative during the radar mode of operation of the unit in its unique time slot.

A major object of the invention is to provide means in a multiplex time-sharing system for preventing spurious responses to interrogations which result from side-lobe or reflected indirectly-arriving illumination of a transponder, or which may result from ring-around triggering of beacon transponders other than those actually directly illuminated by the interrogating beam. The present invention suppresses or avoids such spurious responses by two means, namely: coding of the interrogating signal with corresponding decoding in the interrogated radar, and also by a system of automatic gain control (A.G.C.) located in each interrogated aircraft and comprising a plurality of A.G.C. units each associated with one time slot only and the A.G.C. units in all of the aircraft being sequentially activated as the time slots sequentially occur. Each A.G.C. unit has a memory in the form of a time constant which remembers the strength of the last interrogation signal from the aircraft associated with its assigned time slot and also has an ability to learn whereby it readjusts its remembered signal strength to the value of each newly received interrogation. The level of the A.G.C. memory voltage is then used to adjust the threshold of the transponder in the interrogated aircraft so that, during the associated time slot, the transponder will be responsive to a received signal only if it is of about the same magnitude as the next preceding signal from the same interrogating aircraft. Since side-lobe illumination or indirectly arriving illumination will be materially weaker than the main-lobe direct illumination, the transponder will be unable to reply to any spurious interrogation taking place in the correct time slot but over an indirect or undesirable path of propagation.

Other objects and advantages of the present invention will become apparent during the following discussion of the drawings, wherein:

FIG. 6 is a chart showing the positions of the timing multivibrators and the logical circuits for various instants of time within one complete sequence of time slots.

Figure 1:
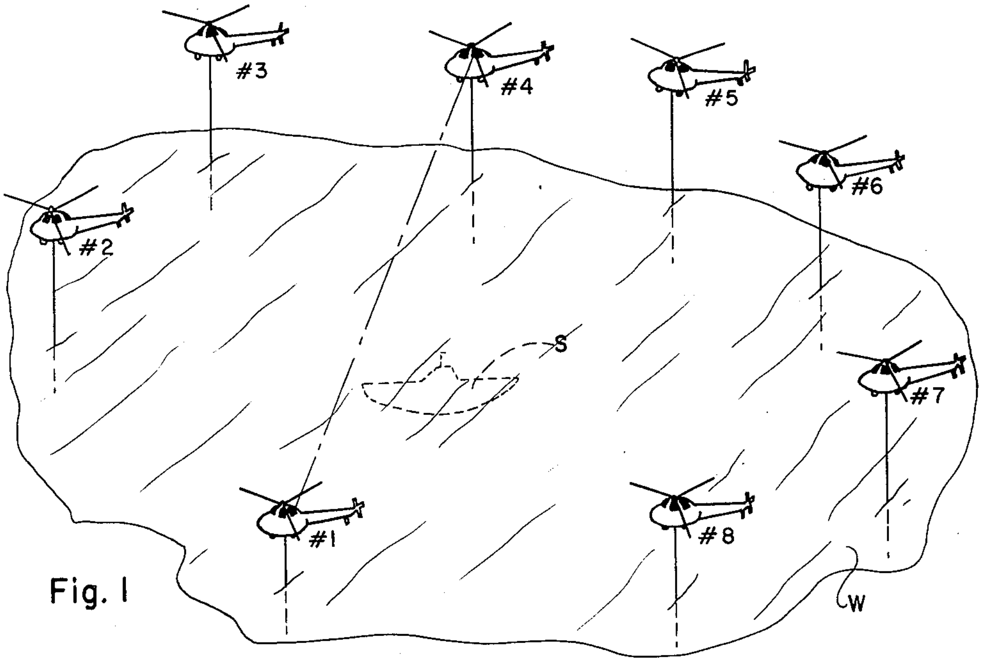
FIG. 1 is a schematic perspective view illustrating a plurality of aircraft, each carrying a radar unit according to the present invention and the group of aircraft comprising the entire system of the present invention, FIG. 1 illustrating one type of maneuver in which the present stationkeeping radar system is particularly useful.

Referring now to the drawings, FIG. 1 illustrates eight helicopters numbered 1 through 8 inclusive, said helicopters hovering over a body of water W in which a submarine S is submerged, the helicopters carrying out anti-submarine warfare according to a plan wherein each helicopter carries at the end of a long cable a dip sonar head, and the maneuver as carried out by all eight aircraft serving to locate the submerged submarine. This figure is intended only to be illustrative of one type of maneuver in which the present radar system is particularly useful.

Figure 2:
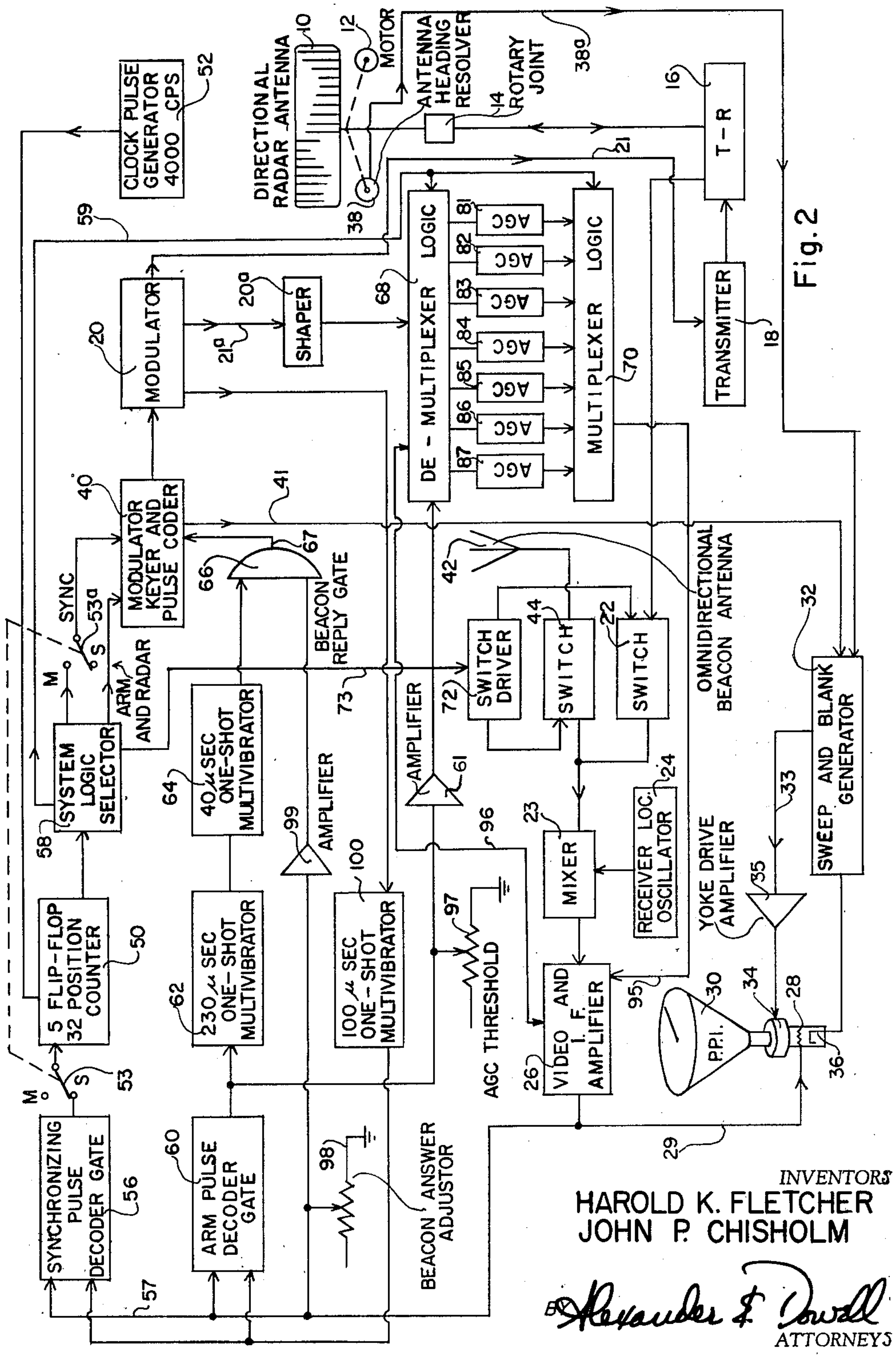
FIG. 2 is a block diagram illustrating one of the radar units of the present system.

Each of the aircraft illustrated in FIG. 1 carries a stationkeeping radar unit of the type illustrated in FIG. 2, and all of the radar units operating sequentially comprising the overall system.

Each of the radar units of this system, as best illustrated in FIG. 2, comprises a directional radar antenna 10 continuously driven by a motor 12 and connected through a rotating joint 14 and a TR box 16 with a pulse transmitter 18 keyed by a modulator 20 at regular intervals. The antenna 10 is also connected by way of the TR box 16 with a low-level switch 22 to the radar receiver mixer 23, a local oscillator 24 and an IF and video amplifier 26 which also includes a detector. Part of the output of the video amplifier 26 is applied over lead 29 to the grid 28 of an indicator cathode ray tube 30 illustrated in the drawing as providing P.P.I. presentation. The sweep for the cathode ray tube 30 is applied by a sweep and blanking generator 32 which is coupled by way of a lead 33 and an amplifier 35 with a deflection yoke 34 on the neck of the cathode ray tube, and which also puts out blanking pulses connected to the cathode 36 of the C.R. tube 30. The motor 12 also drives an antenna heading resolver means 38 which is coupled by way of the lead 38a to the sweep and blanking generator 32 to produce by electrical means sweep signals to rotate the sweep of the cathode ray tubs in unison with the antenna.

The parts of the radar system described so far are common to most radar systems and are not considered novel per se, although they form part of the novel combination of the present invention.

The radar modulator 20 is triggered by a modulator keyer 40 which also delivers an output through the connection 41 to the sweep and blanking generator 32 so as to initiate the sweep on the cathode ray tube 30 each time the transmitter 18 is keyed by the modulator 20 through the connection 21.

The present system, as stated above, comprises a time-sharing sytem which performs two different modes of operation at different times. The shared time sequence is subdivided into individual time slots each one of which is uniquely assigned to one of the aircraft.

According to the particular embodiment of the invention illustrated in the drawings, eight aircraft are employed and these aircraft have been numbered 1 through 8, inclusive. Each one of these aircraft has a unique time slot assigned to it, and during its own time slot the unit in each aircraft performs in a radar mode, whereas during each of the other time slots, the same unit stands ready to perform in a beacon mode if interrogated by another aircraft. When performing in the beacon mode the local radar transmitter 18 becomes part of the transponder. An omnidirectional antenna 42 is mounted on each aircraft in addition to the directional antenna 10 thereon, this omnidirectional antenna being employed to pick up interrogations from other aircraft during the time-slot intervals assigned to said other aircraft regardless of the position of the unit's own directional antenna 10.

This omnidirectional beacon antenna 42 is connected through a second low-level switch 44 with the receiver mixer 23 connected with the IF and video amplifier 26 and with the receiver local oscillator 24, FIG. 2. It is to be noted that the output of the video and IF amplifier 26 is connected with the grid 28 of the cathode ray tube 30 by way of the lead 29. Therefore, all signals received by way of either switch 22 or switch 44, when operative, are applied to the same P.P.I. presentation, although it is to be understood that other types of presentation may be employed without changing the basic concepts of the present invention.

Because of the fact that each radar and beacon unit in the system must operate as a pure radar during its own time slot and as a beacon transponder during all of the time slots assigned to the other aircraft in the system, means must be provided at each radar unit to effect switching of the two functions and to provide such information as is necessary to clearly define all of the time slots in all of the units of the system so that none of the individual aircraft units can fall out of step with the overall scheme of time division. The timing of all of the individual radar units of the type illustrated in FIG. 2 is dependent upon a repeating sequence of time slots, one time slot for each radar unit, and eight time slots total in the embodiment illustrated in the present drawings.

In the present example, each time slot has been selected to be 1000 microseconds in duration so that the entire sequence of time slots covers 8000 microseconds. It is necessary that all of the helicopters 1–8, incusive, be synchronized as to timing, and for this purpose one of the eight helicopters is arbitrarily designated as a master unit whereas the other seven helicopters are slave units. Each of the eight helicopters includes electronic clock means comprising a counter driven by an oscillator which is crystal-controlled to provide an accurate time base. The counter is designated in FIG. 2 by the reference character 50 and in a practical embodiment comprises any suitable ring counter means such as a series of flip-flop multivibrators which are synchronized to external triggering waves to be presently discussed. In each of the helicopters, a clock pulse generator 52 is coupled with the flip-flop counter 50 and supplies pulses at the rate of, for example, 4000 per second so that the space between pulses is 250 microseconds. Four of these pulses, therefore, comprise one 1000 microsecond time slot.

However, it is not enough that time slots of substantially similar duration be provided in the various aircraft; it is additionally necessary that such time slots be synchronized, not only as to the beginning and ending of each sequence, but with sufficient accuracy that the time slot divisions in the various aircraft are maintained in phase with each other. For this purpose, a synchronizing pulse is emitted from the master helicopter at the beginning of each sequence of time slots, and this synchronizing pulse is used to initiate the counting in each counter 50 through the sequence of time slots so that all of the aircraft begin the sequence of time slots at the same instant of time. The clock pulse generator 52 in each aircraft is then of sufficient accuracy so that for the duration of one sequence of the time slots, each of the time slots in the various aircraft begin and end substantially simultaneously.

A switch 53 is provided in the radar unit and this switch has two positions, the position "S" serving to connect the counter 50 for operation as a slave unit, and the position "M" of switch 53 serving to disconnect the counter 50 during operation as the master unit. During operation as a master unit synchronizing pulses are generated in the system logic selector 58 in the master radar unit and applied through the "M" terminal of the switch 53a to the modulator and pulse coder 40 to drive the modulator 20, the pulses in the present illustration appearing at the rate of 125 pulses per second, the space between pulses therefore being 8000 microseconds, or eight time slots. These 125-cycle-per-second synchronizing pulses serve in the master radar unit as the basic time sequence initiator for the entire aircraft system.

On the other hand, where the radar unit is to operate as a slave unit, the switch 53 will then be connected in the "S" position in which it is illustrated in the drawing, and in this position the flip-flop counter 50 is connected to a synchronizing pulse decoder gate bearing the reference numeral 56. This decoder gate is connected by way of a lead 57 with the output of the video and IF amplifier 26.

Again considering the case where the present unit is operating as the master, when a synchronizing pulse is to be propagated thereby, the transmission takes place by keying the transmitter 18 in the master aircraft by triggering the modulator 20. For this purpose, the second switch 53a connects a triggering pulse from the system logic selector 58 to the modulator 20 to key the latter. The switch 53a is also illustrated as connected in its slave position "S" and this switch is in fact ganged to the switch 53 previously described. The system logic selector will be more fully described hereinafter, but for present purposes it is sufficient to state that its function in connection with operation of the unit as a master unit is simply to key the modulator 20. When the modulator 20 is keyed the transmitter in the master aircraft is then energized to initiate a synchronizing pulse.

However, because the synchronizing pulse initiated by the transmitter 18 would be the same pulse as an ordinary radar pulse, and, as such, would be unrecognizable by the other aircraft as comprising a synchronizing pulse, the synchronizing pulses would become lost among the radar pulses. In other words, the slave aircraft would mistake a synchronizing pulse for an ordinary radar interrogation pulse from the master aircraft, or vice versa. It is therefore necessary to identify those transmitted pulses from the transmitter 18 which are intended to be synchronizing pulses as distinguished from radar interrogation pulses. In order to accomplish this purpose, a coded pair of pulses is transmitted with a spacing between the pulses of a precisely determined amount. In the example illustrated, each transmitted pulse from any of the transmitters 18 in the system is one microsecond in duration, and where the pulses are intended to comprise sequence-synchronizing pulses, two such one-microsecond pulses are transmitted with a five-microsecond spacing therebetween.

Each of the receivers in all of the aircraft receives this coded pair of synchronizing pulses having the aforementioned five-microsecond spacing and it is the function of the synchronizing pulse decoder gate 56 to distinguish between paired pulses having a five-microsecond spacing and all other pulses received. When such paired pulses are received and applied by way of the connection 57 to the synchronizing pulse decoder gate 56, the gate is then opened and a pulse is transmitted through the switch 53 when in the slave position "S" to the counter 50, which pulse resets the counter and starts it counting from zero again.

Figure 3:
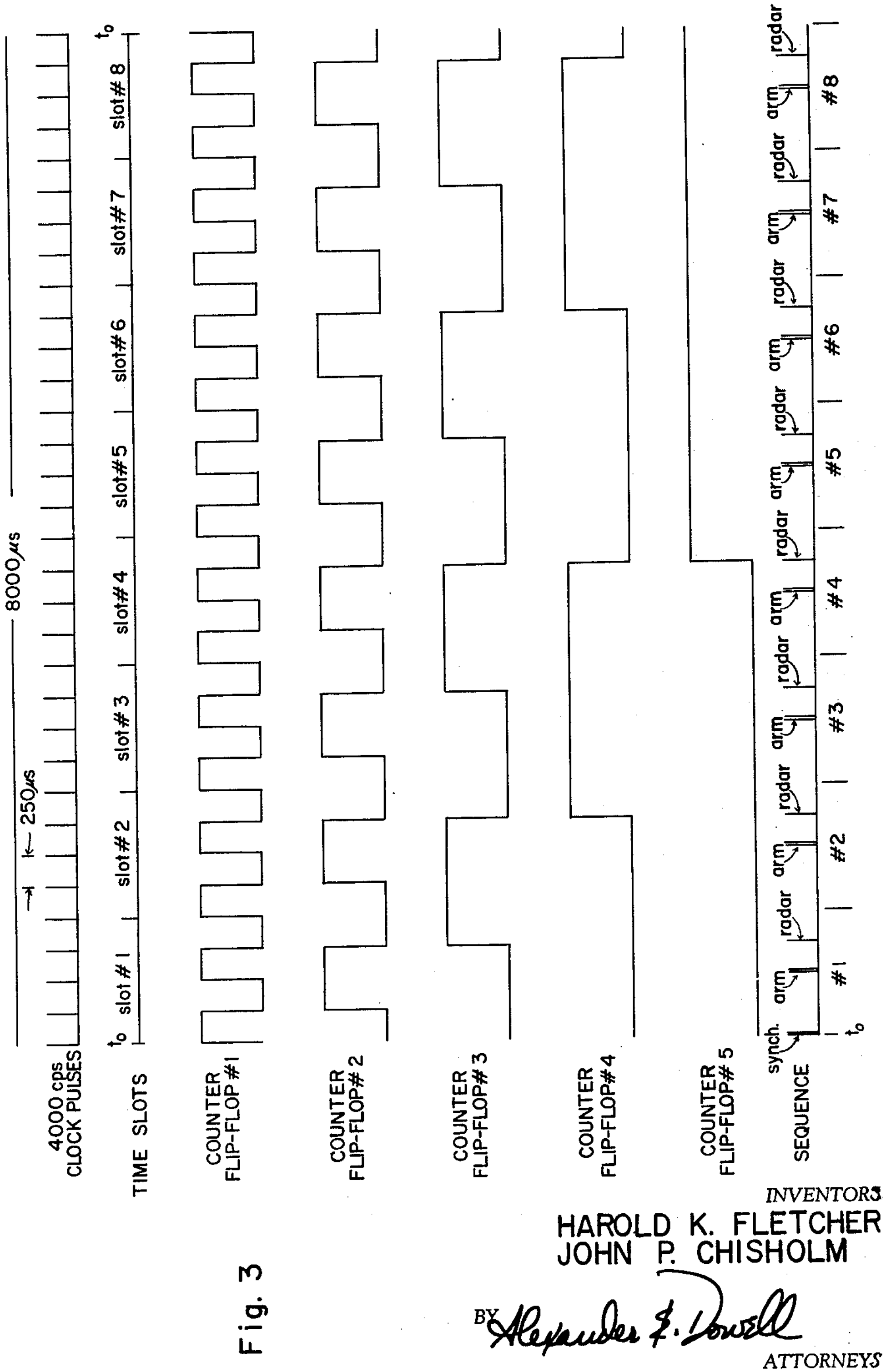
FIG. 3 is a chart illustrating the timing and sequence of events occurring during operation of the eight radar units illustrated in FIG. 1 on a time-sharing basis.

The counter then counts 8000 microseconds delivering a pulse every 250 microseconds during that interval to provide eight 1000-microsecond time slots each of which is divided into four 250 microsecond intervals as can be seen by inspection of FIG. 3. The counter itself will be more fully described in connection with FIG. 3 at a later point in the present specification.

The system described thus far comprises a simple time-sharing system employing one of the aircraft as a master unit which issues coded synchronizing pulses to synchronize the electronic counters in the other aircraft which serve as slave units. However, such a simplified system is not practical because it suffers from several very serious deficiencies. These deficiencies are partly attributable to what is known in the art as the "ring-around" effect, and partly attributable to the tendency of aircraft to become confused when operating as transponder beacons by multiple-path transmission of interrogating pulses which occurs due to reflection of transmitted pulses from nearby objects. For instance, if two slave aircraft are operating near each other, when one aircraft is interrogated by the beam from an interrogating aircraft, the beam may reflect off of the interrogated aircraft and be received at the second aircraft located nearby which is in fact not illuminated by the main beam of the interrogating aircraft. This would result in a spurious transponder response from the second aircraft which would then provide a false indication of its position on the indicator unit of the interrogating aircraft. The present invention provides means for overcoming these defects without hampering the efficiency of the system as a whole.

Referring again to FIG. 2, it will be seen that the output of the video amplifier is also coupled to an arm pulse decoder gate 60 which together with two one-shot multivibrators 62 and 64 activate the beacon reply gate 66 at appropriate instants so that when an interrogating pulse received in the omnidirectional beacon antenna 42 and is passed through the receiver mixer 23 and the video amplifier 26, the beacon reply gate will either permit a pulse to pass therethrough to the modulator keyer 40 by way of the connection 67, or alternatively will prevent the passage of such a pulse. If the beacon reply gate 66 is open and passes a pulse through the connection 67 to the modulator keyer 40, the keyer will in turn trigger the modulator 20 which in turn will key the transmitter 18 and cause it to send out a transponder reply pulse to the interrogating aircraft. All transponder reply pulses are sent out by the transmitter 18 through the directional antenna 10 and at full transmitter power so that the interrogating aircraft will receive the reply even though the antenna 10 may be facing away from it. One important reason for transmitting a pulse from each slave unit interrogated is to provide at the indicator unit of the interrogating aircraft a very strong and distinctive reply which will stand out quite prominently over the other radar echoes being received at that indicator unit. In other words, the operator of the radar by looking at the PPI scope will be able to immediately distinguish the transponder reply pulses representing the other aircraft in the system from general radar echoes by the greatly increased intensity and shape of the transponder indications.

The problem, however, is to prevent false triggering of the transponders in the various aircraft which would result in spurious replies. Note that every spurious reply from a transponder which was triggered but which should not have been triggered, will place a false indication on the interrogating aircraft's indicator unit, which false indication will make it appear that there are more aircraft participating in the system than actually exist. It is therefore necessary that each aircraft initiate a transponder reply only when that aircraft is directly illuminated by the main lobe of the interrogating aircraft. In other words, no transponder response should be provided if the energy received at a particular aircraft is arriving thereat from a side lobe of an interrogating beam or by reflection off of an adjacent object such as another aircraft. In order to accomplish this distinction, the present system employs several improvements over the prior art, as follows.

Referring again to the flip-flop counter 50, this counter contains five flip-flops which are all coupled together so as to provide trains of output switching pulses as illustrated in the five square-wave shapes of FIG. 3 which are respectively labeled counter flip-flop No. 1 through counter flip-flop No. 5, inclusive. Each of these flip-flops is related to the preceding and the following flip-flop by a frequency factor of 2:1. Flip-flop No. 1 operates at the highest rate and is reversed by each of the clock pulses shown in the uppermost line of wave forms in FIG. 3. There are ten outputs from the five flip-flops, and these ten outputs are arranged in pairs such that when one output in each group goes positive, the other goes negative.

The box marked "system logic selector" comprises a plurality of coupling diodes which are uniquely connected with the ten outputs of the flip-flop counter 50 so as to provide from the flip-flops a sequence of unique positions which actually comprise 32 different combinations. Actually, 5 flip-flops provide a capability of more than 32 different positions, but the present system requires only 32 positions in order to operate with eight time slots. In other words, as can be seen at the top row of pulses in FIG. 3, 4000 clock pulses per second provide pulses which are spaced by 250 microseconds, and the total sequence duration of 8000 microseconds therefore requires 32 pulses. The counter 50 includes 5 flip-flops each having two binary output positions which can be used to count 1, 2, 3, 4, 5, 6 . . . 32 and then is reset by the synchronizing decoder gate 56 to begin the count all over again.

Figure 7:
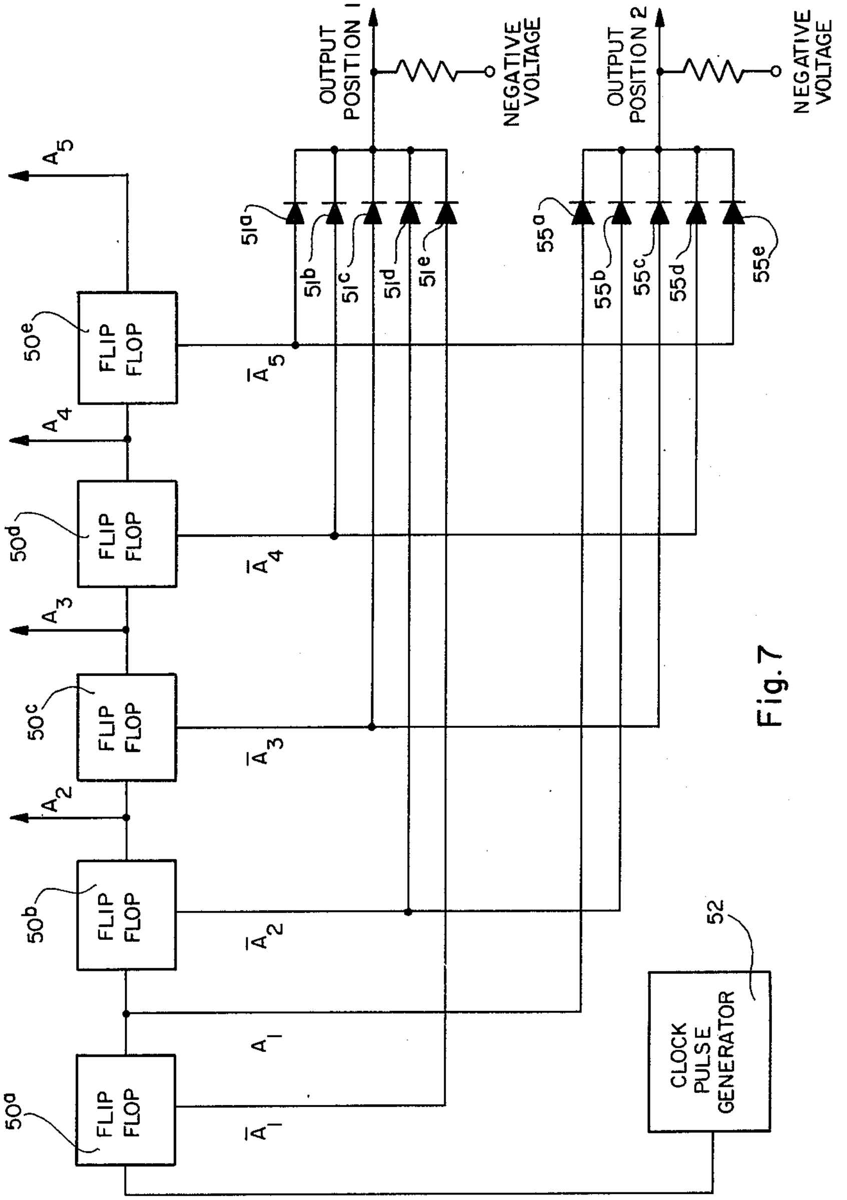
FIG. 7 is a schematic diagram partially showing a suitable specific circuit for the System Logic Selector which is coupled with the 5 Flip-Flop 32-Position Counter and included in the block diagram of FIG. 2.

The system logic selector 58 includes 32 different groups of five diodes each of which diodes in a group is selectively connected to one of the outputs of the five multivibrators, FIG. 7, to provide a system of logic as shown in FIG. 6. By discriminately connecting the groups of five diodes in different combinations, at least 32 positions can be extracted over each interval of 8000 microseconds. Moreover, the five diodes in each group are so connected that the particular combination of output voltages of the five flip-flops required to provide a pulse at the common junction of the five diodes occurs only once every 32 counts, or 8000 microseconds. By proper arrangement of the groups of five diodes, logic can be provided having 32 unique output positions in which one position is required for each 250 microseconds.

The logic system, therefore, comprises a type of binary system which counts from 1 to 32 in a manner which can best be seen in FIG. 7 and by observing the logic chart of time illustrated in FIG. 6 of the present drawing. The condition of conductivity of the five flip-flops *50a*, *50b*, *50c*, *50d*, and *50e* in the counter 50 is illustrated on the logic chart of FIG. 6 as "zero" and "one" indications in the vertical column near the center of the figure. 32 pulses are illustrated in the left-hand vertical column, and the time in microseconds is illustrated in the second column from the right. In the rightmost column, the conditions of output conductivity of the five flip-flops comprising the counter 50 are illustrated as A1–A5, or $a_1$–$\bar{a}_5$, representatively. The presence of the bar over the letter "A" illustrates a "zero" condition of conductivity and the absence of the bar indicates a "one" condition of conductivity.

Figure 5:
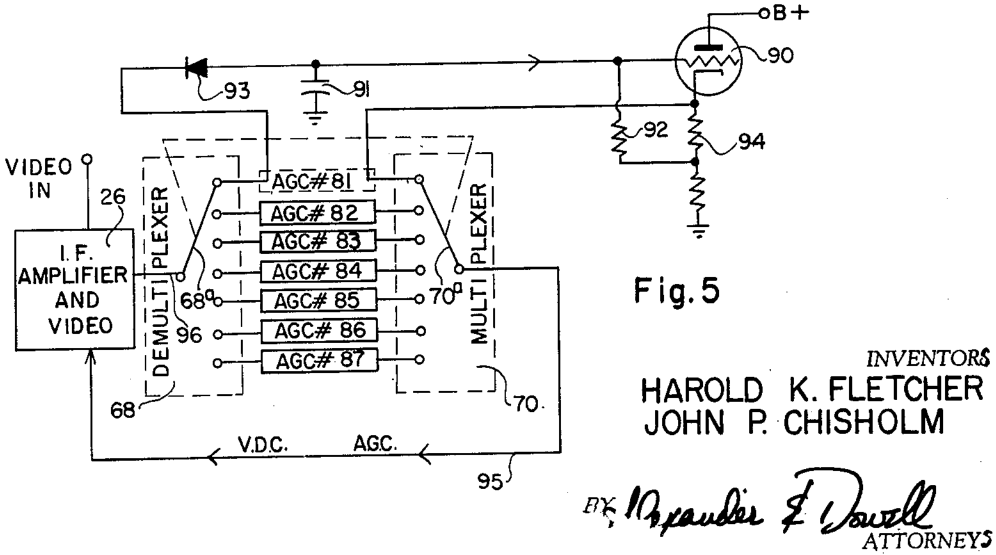
FIG. 5 is a simplified schematic representation illustrating the basic principle of the automatic gain control system employed in the radar unit illustrated in FIG. 2.

The groups of diodes *51a–51e*, *55a–55e*, etc. contained within the system logic selector 58 provide unique outputs when all of the five inputs to the diodes in a group are simultaneously conductive. For example the diodes *51a–51e* in the first group are all conductive when all five flop-flops are in zero conductivity condition so that the diodes in this group are receiving outputs $\bar{A}_1$–$\bar{A}_5$. The second group of diodes *55a–55e* is conductive when the first diode *55a* is receiving a binary one $A_1$ from flip-flop *50a*, and the other diodes in this group are receiving binary zeroes. The output of the particular group of diodes which is conductive is then delivered by way of the connections generally labeled 59 in FIG. 2 to a demultiplexer logic 68 and a multiplexer logic 70. These circuits actually comprise electronic switches as best shown in an illustrative analogous representation shown in FIG. 5. In other words, every fourth pulse received from the clock pulse generator 52, and every fourth count of the counter 50 synchronized therewith moves the switches *68a* and *70a* one step, and each time these switches move one step, the entire system advances to the next succeeding time slot. Actually, the multiplexer and demultiplexer logics do not comprise mechanical switches as schematically illustrated in FIG. 5, but the function thereof is the same.

When these switches are advanced, step by step, a different automatic gain control circuit is connected with the IF amplifier 26 for a purpose to be hereinafter more fully explained. However, one of the outputs of the system logic selector 58 is also connected to the modulator keyer 40 in each of the aircraft units. The particular output of the selector 58 which is connected with the modulator keyer 40 represents the time slot assigned to that aircraft and therefore differs from aircraft to aircraft representing in each case a different time slot.

In other words, as stated above, there are 32 positions of the selector 58. Every fourth position represents a different time slot and each aircraft has a different output of the selector 58 connected with the keyer 40. When that particular position which is connected to the keyer 40 becomes energized, the keyer keys the modulator 20 which in turn fires the transmitter and delivers a pulse. The exact sequence of fired pulses will be explained more fully hereinafter. In general, then, the system logic selector performs two major functions, namely, it determines the instance of time during which each modulator is keyed according to whose time slot is presently active. Secondly, it actuates the multiplexer and demultiplexer logic circuits 68 and 70 so as to determine which of the automatic gain control circuits 1 through 7 is presently active according to which time slot is presently passing.

The logic selector, however, also performs the function of switching the radar receiver by delivering appropriate pulses to the radar receiver switch driver 72 so as to disconnect the directional radar antenna 10 and connect the omnidirectional antenna 42 when the present radar unit's time slot has passed. Thus only one antenna at a time is connected to the receiver mixer 23 to prevent signals received at the radar-receiving antenna 10 from amplitude modulating the energy received at the omnidirectional antenna 42. If the interrogations of a particular aircraft unit were permitted to pass through a directional radar-receiving system instead of the beacon-receiving system, the function of the automatic gain control circuits which are selected by the multiplexer and demultiplexer logics 70 and 68 would be made vastly more difficult since an additional variable would be introduced dependent upon the position of the directional radar antenna. It is therefore desirable that the receiving mixer be switched by the switches 22 and 44 so that the former is closed to complete the circuit through this TR box 16 between the directional antenna 10 and the mixer 23 only during the present aircraft unit's own time slot at which time the unit is functioning as a pure radar. The switching of the switches 22 and 44 is controlled through the connection 73 from the system logic selector 58 to the switching driver 72.

At an earlier point in this specification several problems were mentioned relating to confusion which might occur if a second radar located near a first interrogated radar received an interrogating signal of sufficient strength to trigger its transponder by reflection off of the side of the first interrogated aircraft which was in fact in the main beam of the interrogating antenna. In a system comprising eight aircraft it would be highly desirable if each aircraft could keep track of the proximity of each of the other aircraft in order to anticipate from knowledge of its signal strength on a preceding interrogation the expected strength of the next interrogating signal therefrom. For example, there is a tremendous difference in signal strength received at an interrogated aircraft when the interrogating aircraft is nearby as distinguished from when it is located at some distance away, for instance ten miles. Therefore, each aircraft unit when operating as a beacon in the system will be replying to seven interrogating aircraft located at various distances away.

It is highly desirable that the beacon reply only to the main-lobe interrogating signals which were actually issued by aircraft of its own system, and that it should not reply to any other signals. There are two pieces of information which can be utilized in order to improve the likelihood of a proper reply.

In the first place, this system employs a plurality of automatic gain control circuits each of which has a memory and an ability to learn but each of which is assigned to a particular time slot other than the time slot in which the present aircraft is operating as a radar. Thus, if the present discussion relates to the beacon equipment located on helicopter No. 1, then the third A.G.C. circuit labeled 83 in FIG. 2 will be assigned to helicopter No. 4, since no A.G.C. circuit is assigned to helicopter No. 1 in which the present equipment is located. A.G.C. 83 will remember the signal strength emitted from helicopter No. 4 the last time it interrogated helicopter No. 1 and in addition A.G.C. circuit No. 83 will learn from each present interrogation by helicopter No. 4 so as to correct its remembered A.G.C. level to meet conditions existing at the time of the latest interrogation. The incremental changes in level in the various A.G.C. circuits will be small because of the rapidly recurring indications, and therefore each correction need only be a small increment.

By reference to FIG. 5, it will be noted that each A.G.C. circuit comprises a vacuum tube 90 having a grid circuit including a time constant capacitor 91 and a time constant resistor 92. The incoming signal from the IF and video amplifier 26 is applied to the RC time constant 91–92 through a diode 93; and the tube 90, being connected as a cathode follower, will provide voltage across the resistance 94 which is proportional to the instantaneous level to which the condenser 91 is charged. Suitable operating potentials are supplied for the tube 90 so that the output at its cathode can accurately follow the D.C. level of the detected video applied through the diode 93 to change the RC circuit 91–92. This RC circuit employs a large condenser and a very high resistance giving a time constant of approximately 4 seconds. A four-second time constant is required in the illustrated embodiment to assure good memory characteristics between 360° antenna rotations, since the antenna 10 of each radar makes one revolution every four seconds. In the absence of a long time constant, the decay of AVC voltage would be such as to permit false answering of beacon functions to weaker spurious signals. The other A.G.C. circuits 82–87, inclusive, are identical with the circuit schematically illustrated in connection with A.G.C. 81 in FIG. 5.

The switch 70*a* connects the output of the cathode of the tube 90 back through the A. G. C. line 95 to the video amplifier 26 to thereby control the gain of the latter so that the gain of this amplifier is changed in accordance with each A.G.C. circuit to which it is successively connected for the purpose of providing a substantially constant output voltage for each received interrogation regardless of the position of the interrogating aircraft with respect to the present unit, as long as the interrogating aircraft is within range thereof. Indirectly, a signal is taken from the IF amplifier 26 along the connection 96 and is applied to the demultiplexer which then connects this signal to the proper A.G.C. circuit depending on which time slot is presently operative. This signal serves to correct the voltage level of the A.G.C. circuit to which it is connected while at the same time the existing A.G.C. level as taken from the cathode of the cathode follower tube 90 is applied to another stage of the video amplifier 26 along the lead 95 in order to alter its overall gain in proportion to the remembered level of intensity of the preceding interrogation from the same aircraft. The purpose of this adjustment of the gain is not to produce a constant signal at the output of the receiver, but to produce a signal which can be used to cooperate with a threshold of sensitivity, adjustable by potentiometer 97 connected by way of amplifier 61 to the de-multiplexer 68, in order to determine whether or not the signal being received at the beacon gate 66 should be responded to by the transponder. In other words, during each interrogation from a particular remotely-located aircraft occupying the presently active time slot, a determination is made of the maximum amplitude of the interrogating signal, this maximum amplitude occurring when the main lobe of the interrogating beam is directly on the present receiving antenna. This amplitude is remembered by the A.G.C. circuit, and the A.G.C. adjusts the sensitivity of the IF strip of the receiver durnig the next occurrence of the same time slot so that the receiver will be sensitive enough to respond to another main-lobe illumination, but will not be sensitive enough to respond to a side-lobe illumination or an illumination received by way of an indirect reflection path.

Actually it is not the receiver sensitivity that determines whether the present transponder will reply to an interrogation signal, it is the beacon reply gate 66 to which the output signal from the video amplifier 26 is applied by way of a potentiometer 98. The adjustment of this potentiometer 98 sets the level of the video signal applied through amplifier 99 to the beacon reply gate which is necessary to open that reply gate and cause the transmission of a pulse along the connection 67 to the modulator keyer 40 in order to key the transmitter 18 and provide a transponder beacon reply pulse. The A.G.C. circuit then adjusts the sensitivity level of the receiver during each successive time slot to the 3 db level below the maximum of the previously received interrogation so that when an interrogating pulse is received, if it is above this 3 db level, it will trigger a transponder reply, but if it is below this 3 db amplitude level, the present system will not reply at all. However, when the local transmitter is answering as a beacon there is a tendency for some of its transmitted energy to leak through the local receiver and develop unwanted spurious A.G.C. voltage. To prevent this from occurring, a one-microsecond pulse occurring at the same time as each transmitter pulse is taken from the modulator 20 along the lead 21*a* and applied to the demultiplexer 68 through a shaper network 20*a* for an interval of time great enough to gate off the A.G.C. during pulse transmissions.

Thus, a system is provided in which a transponder reply pulse is propagated by the present system only if it is illuminated by a signal during the time slot of a particular aircraft and only if the signal is at least .707 as strong as the last received signal from that aircraft.

Figure 4:
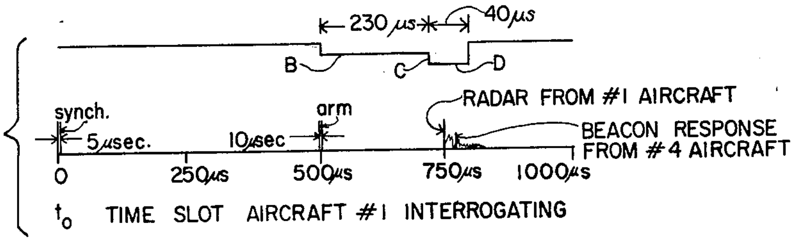
FIG. 4 is a graphical illustration indicating the sequence of events occurring during one representative time slot.

Secondly, another bit of information can be used to reject spurious signals which might have a tendency to trigger the beacon transponder falsely. With reference to FIG. 4, it will be seen that this figure shows one time slot for aircraft No. 1 and illustrating a coded synchronizing pulse pair, followed by a coded arming pulse pair 500 microseconds later and then followed by the main radar pulse at 750 microseconds. This arming pulse pair is generated 250 microseconds prior to each radar interrogation and is transmitted within the same time slot by the same transmitter which transmits the interrogating pulse. The arming pulse is not a single pulse, but comprises a pair of pulses similar to the pair transmitted as synchronizing pulses but having a 10 microsecond spacing between pulses instead of a 5 microsecond spacing. Each aircraft in its own interrogating time slot propagates a pair of coded arming pulses 250 microseconds prior to the transmission of its radar pulse and these arming pulses are also received at the remote aircraft receivers.

The arm pulses at remote receivers pass through the video amplifier 26, FIG. 2, and arrive at the arm pulse decoder gate 60. This gate is sensitive only to coded pulses of large amplitude spaced 10 microseconds apart, and when such pulses are received, a pulse is issued to the 230 microsecond one-shot multivibrator 62 which then delivers a pulse 230 microseconds long as illustrated in FIG. 4, the pulse being marked "B." The trailing edge "C" of this pulse is used to trigger an additional 40 microsecond one-shot multivibrator providing a pulse "D." It will be noted that the 40 microsecond one-shot multivibrator pulse from the multivibrator 64 is therefore initiated at the end of the 230 microsecond pulse and this 40 microsecond pulse in turn keys on the beacon reply gate. The beacon reply gate 66 is on only during the 40 microsecond interval which is approximately centered about the time of occurrence of the radar pulse of that particular time slot. Therefore, a certain tolerance is provided of about 20 microseconds on each side of the expected time of the radar pulse, and only during this time will the beacon reply gate 66 trigger the modulator 40 in order to send out a beacon reply pulse.

In other words, no beacon reply pulse is sent out unless both of two conditions are satisfied. First, the interrogation must occur during the 40 microsecond pulse from the one-shot multivibrator 64. Second, the input signal from the amplifier 99 to the beacon reply gate 66 must exceed the aforementioned 3 db threshold level as determined by whichever one of the A.G.C. circuits is presently operative or else no pulse will be sent along the line 67 to trigger the modulator keyer 40 and the transmitter 18. If either or both of these conditions is not met, no transponder reply pulse will be sent out.

Finally, a 100 microsecond one-shot multivibrator 100 is provided for the purpose of blanking the synchronizing pulse decoder gate 56 and the arm pulse decoder gate 60 for an interval of 100 microseconds during the time that the transmitter in the associated radar is on the air. This was prompted by the fact that radar echoes returning from the radar's own pulse transmissions can become decoded by its own receiver system to falsely arm its own beacon reply system so that when echoes return from its own radar pulses in dense target areas, false beacon responses would be initiated from its own transmitter. These replies would naturally occur during its own radar receiving time and would appear on its PPI as large false beacon returns which would saturate the local receiving equipment. In order to prevent this from occurring, the 100 microsecond multivibrator 100 is used to apply blanking signals to both decoding gates to disable the gates for 100 microseconds after the radar's own transmission time.

We do not limit our invention to the exact forms shown in the drawings, for obviously changes may be made within the scope of the following claims.

We claim:

1. A time-division multiplex system of radar units operating in uniquely assigned time slots forming a repeating time sequence, each unit having a receiver and a transmitter standing ready to perform a beacon transponder function when interrogated by another unit during a time slot assigned thereto and each unit performing a pulse-echo function during its own time slot, said system comprising accurately synchronized time clock means in said units and initiating the radar function of each unit during its own time slot; gated means for initiating a beacon reply pulse from the transmitter in response to an interrogating pulse arriving at the receiver from another unit; and control means connected with said gated means for rendering the latter responsive only to pulses received during the time slots of the other units.

2. In a system as set forth in claim 1, at least one of said units having means for generating coded synchronizing signals and said unit transmitting a synchronizing signal at least once for each sequence of time slots; and said time clock means in each unit comprising a source of clock pulses; a ring counter advanced by said pulses; logic circuit means connected with said ring counter and delivering at least one marker pulse within each time slot to time the beacon and radar function; and synchronizing signal decoder means in each unit coupled to receive said coded synchronizing signals and connected with said ring counter to maintain the latter in step therewith.

3. In a system as set forth in claim 2, said means for generating coded signals comprising timing means for initiating from the transmitter a pair of pulses similar to the radar pulses but mutually spaced apart by a characterizing fixed time interval, and said decoder means comprising a gate circuit responsive only to a pair of pulses having that time interval therebetween.

4. In a system as set forth in claim 1, each unit including a directional antenna; means for rotating said antenna to perform a search radar function; an omnidirectional antenna; and antenna switching means controlled from said clock means for connecting the directional antenna to the receiver during radar function and the omnidirectional antenna to the receiver during beacon function.

5. In a system as set forth in claim 1, a second control means for said gated means, comprising separate memory means associated respectively with the time slots of the other units; selecting means for connecting the memory means sequentially to the receiver to adjust its gain inversely as the strength of the last radar signal received in that time slot, the selecting means being advanced by the clock means once for each time slot, and said gated means having a threshold of sensitivity which the amplitude of an interrogating pulse received from another unit must exceed in order to initiate a reply pulse.

6. A time-division multiplex system of radar units operating in uniquely assigned time slots forming a repeating time sequence, each unit having a receiver and a transmitter standing ready to perform a beacon transponder function during time slots assigned to other units and each unit performing a pulse-echo radar function during its own time slot, said system comprising coded-synchronizing signal generating means in at least one unit for transmitting distinctive synchronizing pulses at least once during each sequence of time slots; accurate time measuring clock means in each unit and initiating the radar function thereof during its own time slot; synchronizing signal decoder means in each unit connected to the clock means to synchronize the latter with said signals; coded arm-signal generating means in each unit for initiating the transmission during the time slot of that unit of a coded arm signal a predetermined interval prior to each radar pulse transmission thereof; arm-signal decoder means in each unit responsive to received arm signals; a beacon transponder gate in each unit and initiating the transmission of a reply pulse whenever the gate is open; and delay means coupling the arm-signal decoder means to said beacon gate for opening the latter at said predetermined interval after reception of an arm signal.

7. In a system as set forth in claim 6, said means for generating coded signals comprising timing means for initiating from the transmitter a pair of pulses similar to the radar pulses but mutually spaced apart by a characterizing fixed time interval, and said decoder means comprising a gate circuit responsive only to a pair of pulses having that time interval therebetween.

8. In a system as set forth in claim 6, each unit including a directional antenna; means for rotating said antenna to perform a search radar function; an omnidirectional antenna; and antenna switching means controlled from said clock means for connecting the directional antenna to the receiver during radar function and the omnidirectional antenna to the receiver during beacon function.

9. In a system as set forth in claim 6, said delay means comprising monostable multivibrator means triggered to unstable equilibrium upon decoding of an arm signal and returning to stable state just prior to the end of said predetermined interval; and a second monostable multivibrator triggered by the return to stable state of the first multivibrator, the second multivibrator activating the beacon gate during its unstable state equilibrium having a time constant lasting for the duration of a radar function receiving interval beyond the time of the radar pulse.

10. In a system as set forth in claim 6, decoder blanking means having a time constant longer than the radar receiving interval of the unit and keyed by the transmitter in the unit for blanking during the radar function of a unit the decoder means thereof to prevent response thereby to the unit's own transmitted pulses.

11. A time-division multiplex system of radar units operating in uniquely assigned time slots forming a repeating time sequence, each unit having a receiver and a transmitter standing ready to perform a beacon transponder function during time slots assigned to other units and each unit performing a pulse-echo radar function during its own time slot, said system comprising accurately synchronized time clock means in said units and initiating the radar function of each unit during its own time slot; beacon reply gate means connected to activate the transmitter to perform a reply function and having an input; a coded arm-signal generator in each radar unit for initiating an arm-signal transmission a predetermined time prior to the radar pulse transmission therefrom; arm-signal decoder means in each unit responsive to received arm signals; and delay means coupling said decoder means to said input of the beacon reply gate for activating said gate at said predetermined time after reception of an arm signal whereby a reply pulse will be transmitted.

12. In a system as set forth in claim 11, said means for generating coded signals comprising timing means for initiating from the transmitter a pair of pulses similar to the radar pulses but mutually spaced apart by a characterizing fixed time interval, and said decoder means comprising a gate circuit responsive only to a pair of pulses having that time interval therebetween.

13. In a system as set forth in claim 11, said delay means comprising monostable multivibrator means triggered to unstable equilibrium upon decoding of an arm signal and returning to stable state just prior to the end of said predetermined interval; and a second monostable multivibrator triggered by the return to stable state of the first multivibrator, the second multivibrator activating the beacon gate during its unstable state equilibrium having a time constant lasting for the duration of a radar function receiving interval beyond the time of the radar pulse.

14. In a system as set forth in claim 11, decoder blanking means having a time constant longer than the radar receiving interval of the unit and keyed by the transmitter in the unit for blanking during the radar function of a unit the decoder means thereof to prevent response thereby to the unit's own transmitted pulses.

15. A time-division multiplex system of mobile radar units capable of changing their mutually relative positions and operating in uniquely assigned time slots forming a repeating time sequence, each unit having a receiver and a transmitter standing ready to perform a beacon transponder function during time slots assigned to other units and each unit performing a pulse-echo radar function during its own time slot, said system comprising accurately synchronized time clock means in said units and initiating the radar function of each unit during its own time slot; beacon reply gate means connected to activate the transmitter to perform a reply function, the gate means having an input controlled by the local receiver and having a threshold of sensitivity which the amplitude of an interrogating pulse from another unit must exceed in order to open the gate to trigger a reply transmission; a plurality of automatic gain control memory means in each unit and each assigned respectively to one of the other units; selecting means coupled with said memory means and switched by said time clock means to sequentially connect the memory means to the local receiver to adjust its gain relative to said threshold; and learning means coupled with an output of the local receiver for readjusting the level of each memory means to be at least as great as the largest amplitude signal received during that time slot.

16. In a system as set forth in claim 15, each unit including a directional antenna; means for rotating said antenna to perform a search radar function; an omnidirectional antenna; and antenna switching means controlled from said clock means for connecting the directional antenna to the receiver during radar function and the omindirectional antenna to the receiver during beacon function.

17. In a system as set forth in claim 15, each memory means comprising an R–C time constant chargeable to a voltage representing the amplitude of a received signal; a cathode follower stage having a control grid coupled to said R–C time constant and a cathode resistor across which a voltage of magnitude equaling the charge on the time constant appears, the cathode being coupled through said selecting means to the automatic gain control circuit of the receiver; and said learning means comprising diode means coupled by said selecting means from an output of said receiver to said time constant to charge the latter to the rectified level to the largest signal received during that time slot.

18. In a system as set forth in claim 15, each unit including a PPI presentation and the system serving as mobile-unit stationkeeping means; indicator unit blanking means connected with the transmitter and gate means to unblank the presentation in each unit only during the unit's own time slot whereby the unit displays only those beacon replies from other units which are received during said time slot.

19. A time-division multiplex system of mobile radar units capable of changing their mutually relative positions and operating in uniquely assigned time slots forming a repeating time sequence, each unit having a receiver and a transmitter standing ready to perform a beacon transponder function during time slots assigned to other units and each unit performing a pulse-echo radar function during its own time slot, said system comprising accurately synchronized time clock means in said units and initiating the radar function of each unit during its own time slot; beacon reply gate means connected to activate the transmitter to perform a reply function, the gate means having a first input controlled by the local receiver and having a threshold of sensitivity which the amplitude of an interrogating pulse from another unit must exceed in order to open the gate to trigger a reply transmission and the gate having a second input; a plurality of automatic gain control memory means in each unit and each assigned respectively to one of the other units; selecting means coupled with said memory means and switched by said time clock means to sequentially connect the memory means to the local receiver to adjust its gain relative to said threshold; learning means coupled with an output of the local receiver for readjusting the level of each memory means to be at least as great as the largest amplitude signal received during that time slot; a coded arm-signal generator in each radar unit initiating an arm-signal transmission therefrom; arm-signal decoder means in each unit responsive to received arm signals; and delay means coupling said decoder means to said second input of the beacon reply gate for activating said second input at said predetermined time after reception of an arm signal, whereby a reply will be transmitted when both the first and second gate inputs are activated.

20. In a system as set forth in claim 19, said means for generating coded signals comprising timing means for initiating from the transmitter a pair of pulses similar to the radar pulses but mutually spaced apart by a characterizing fixed time interval, and said decoder means comprising a gate circuit responsive only to a pair of pulses having that time interval therebetween.

21. In a system as set forth in claim 19, said delay means comprising monostable multivibrator means triggered to unstable equilibrium upon decoding of an arm signal and returning to stable state just prior to the end of said predetermined interval; and a second monostable multivibrator triggered by the return to stable state of the first multivibrator, the second multivibrator activating the beacon gate during its unstable state equilibrium having a time constant lasting for the duration of a radar function receiving interval beyond the time of the radar pulse.

22. In a system as set forth in claim 19, decoder blanking means having a time constant longer than the radar receiving interval of the unit and keyed by the transmitter in the unit for blanking during the radar function of a unit the decoder means thereof to prevent response thereby to the unit's own transmitted pulses.

23. In a system as set forth in claim 19, each unit including a directional antenna; means for rotating said antenna to perform a search radar function; an omnidirectional antenna; and antenna switching means controlled from said clock means for connecting the directional antenna to the receiver during radar function and the omnidirectional antenna to the receiver during beacon function.

24. In a system as set forth in claim 19, each memory means comprising an R-C time constant chargeable to a voltage representing the amplitude of a received signal; a cathode follower stage having a control grid coupled to said R-C time constant and a cathode resistor across which a voltage of magnitude equaling the charge on the time constant appears, the cathode being coupled through said selecting means to the automatic gain control circuit of the receiver; and said learning means comprising diode means coupled by said selecting means from an output of said receiver to said time constant to charge the latter to the rectified level to the largest signal received during that time slot.

25. In a system as set forth in claim 19, each unit including a PPI presentation and the system serving as mobile-unit stationkeeping means; indicator unit blanking means connected with the transmitter and gate means to unblank the presentation in each unit only during the unit's own time slot whereby the unit displays only those beacon replies from other units which are received during said time slot.

No references cited.